May 22, 1956 V. E. PRATT ET AL 2,746,344
MICROFILM READER
Filed Sept. 21, 1951 5 Sheets-Sheet 1
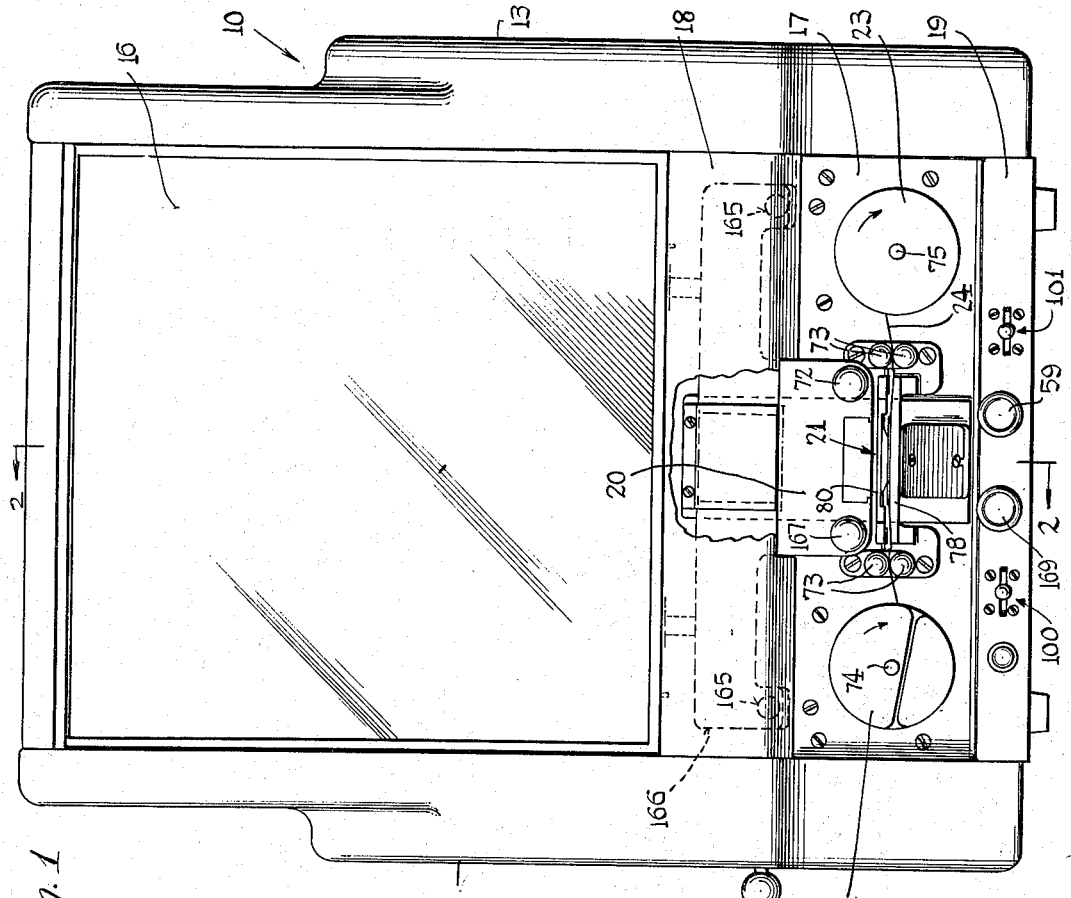
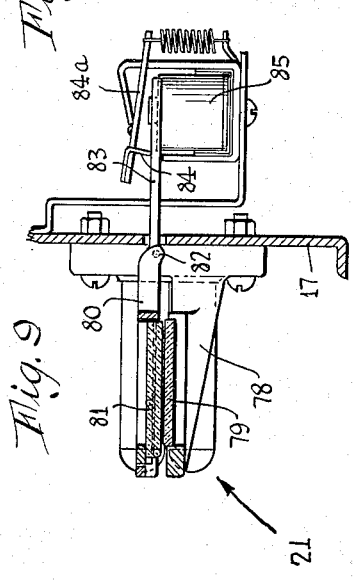
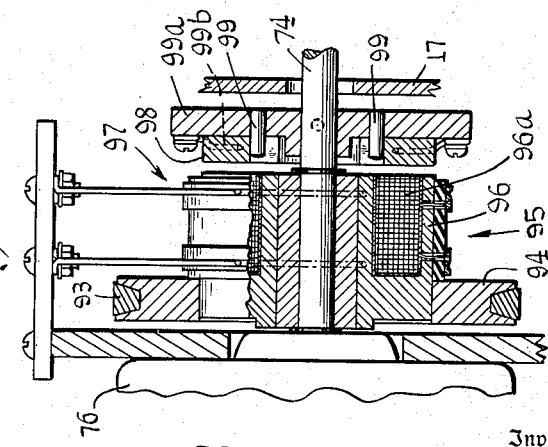
Inventors
Verneur E. Pratt
George F. Gray
By Johnson and Kline
Attorneys

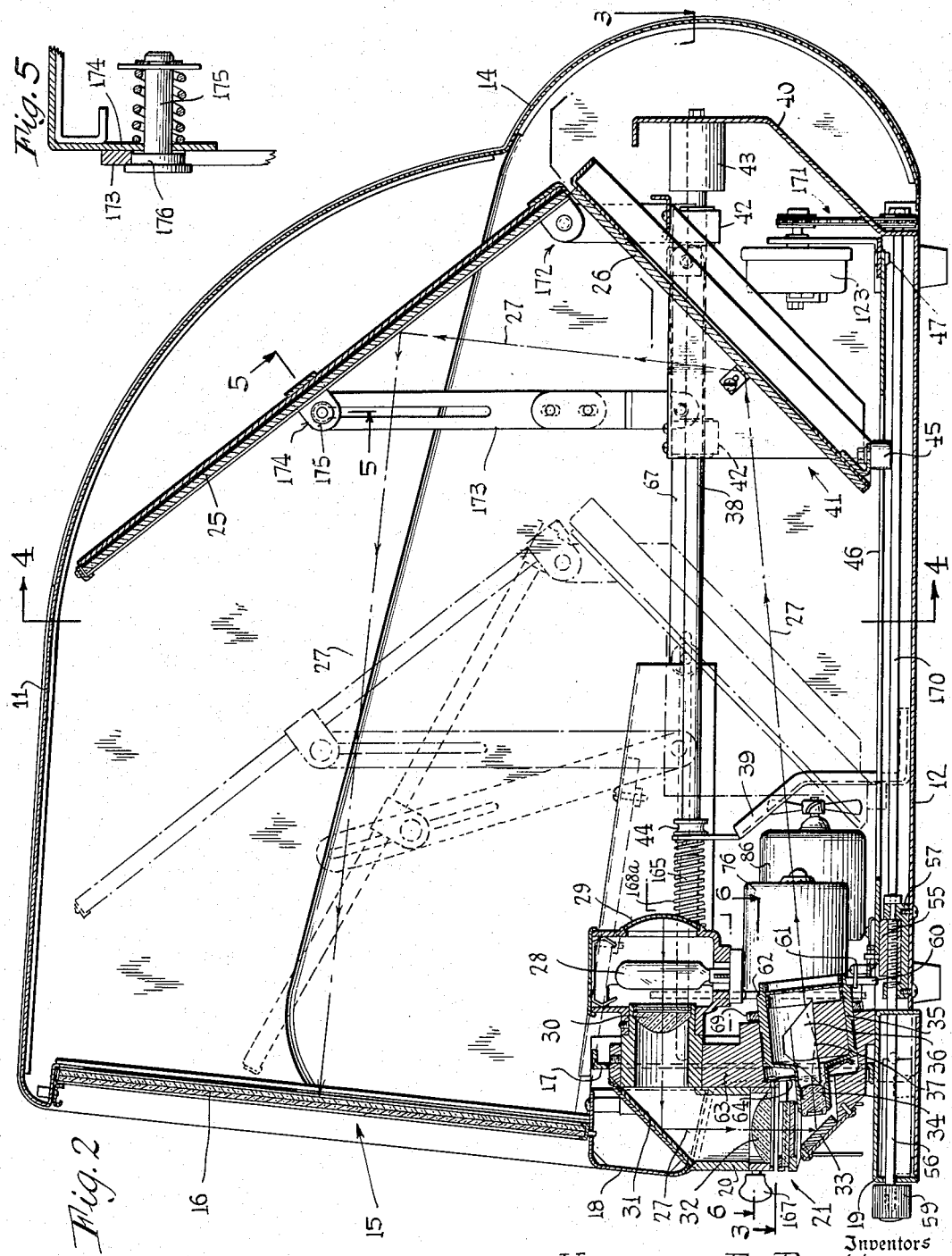

May 22, 1956 V. E. PRATT ET AL 2,746,344
MICROFILM READER
Filed Sept. 21, 1951 5 Sheets-Sheet 3

Inventors
Verneur E. Pratt
George F. Gray
By
Johnson and Kline
Attorneys

May 22, 1956   V. E. PRATT ET AL   2,746,344
MICROFILM READER
Filed Sept. 21, 1951   5 Sheets-Sheet 4
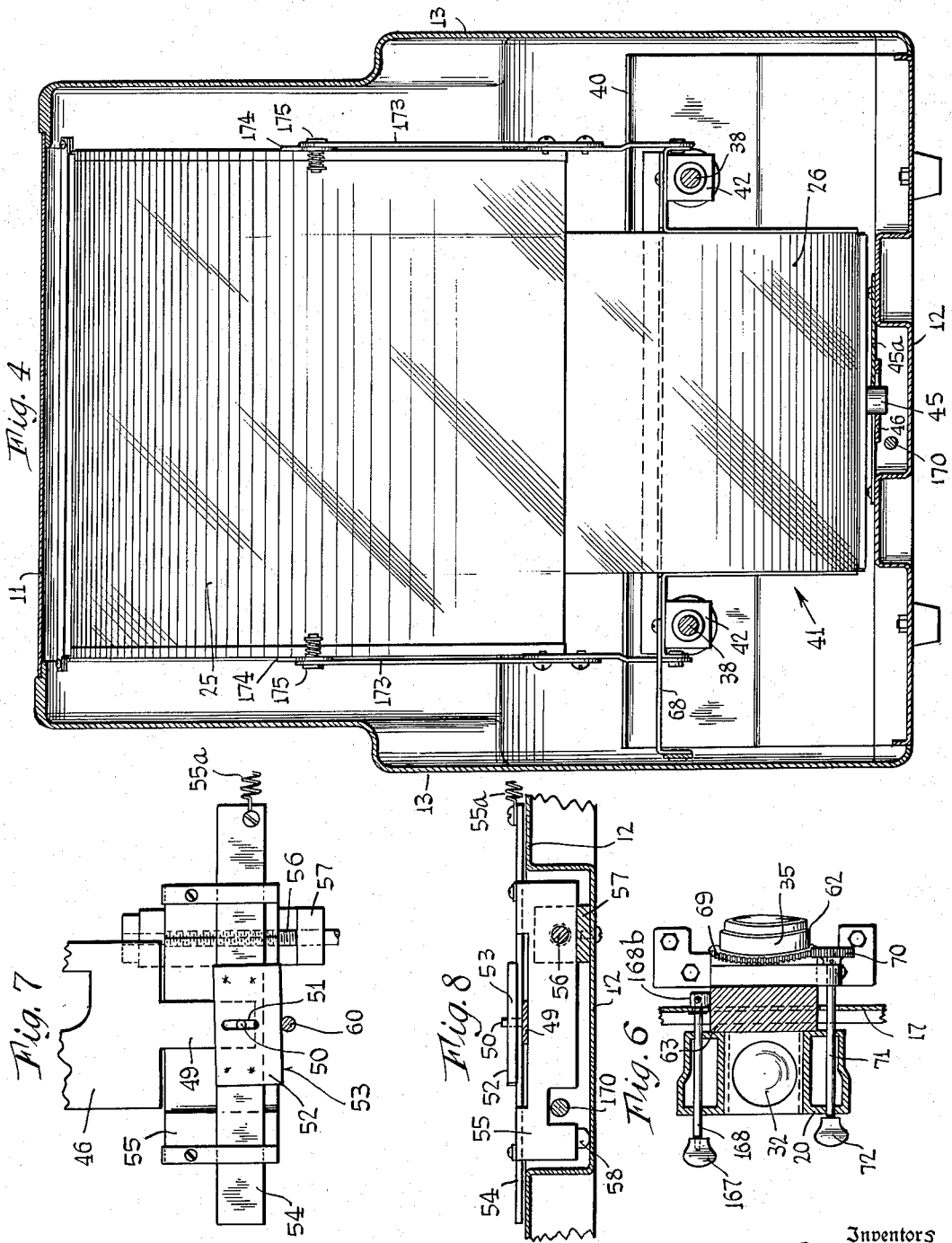
Inventors
Verneur E. Pratt
George F. Gray
By
Johnson and Kline
Attorneys

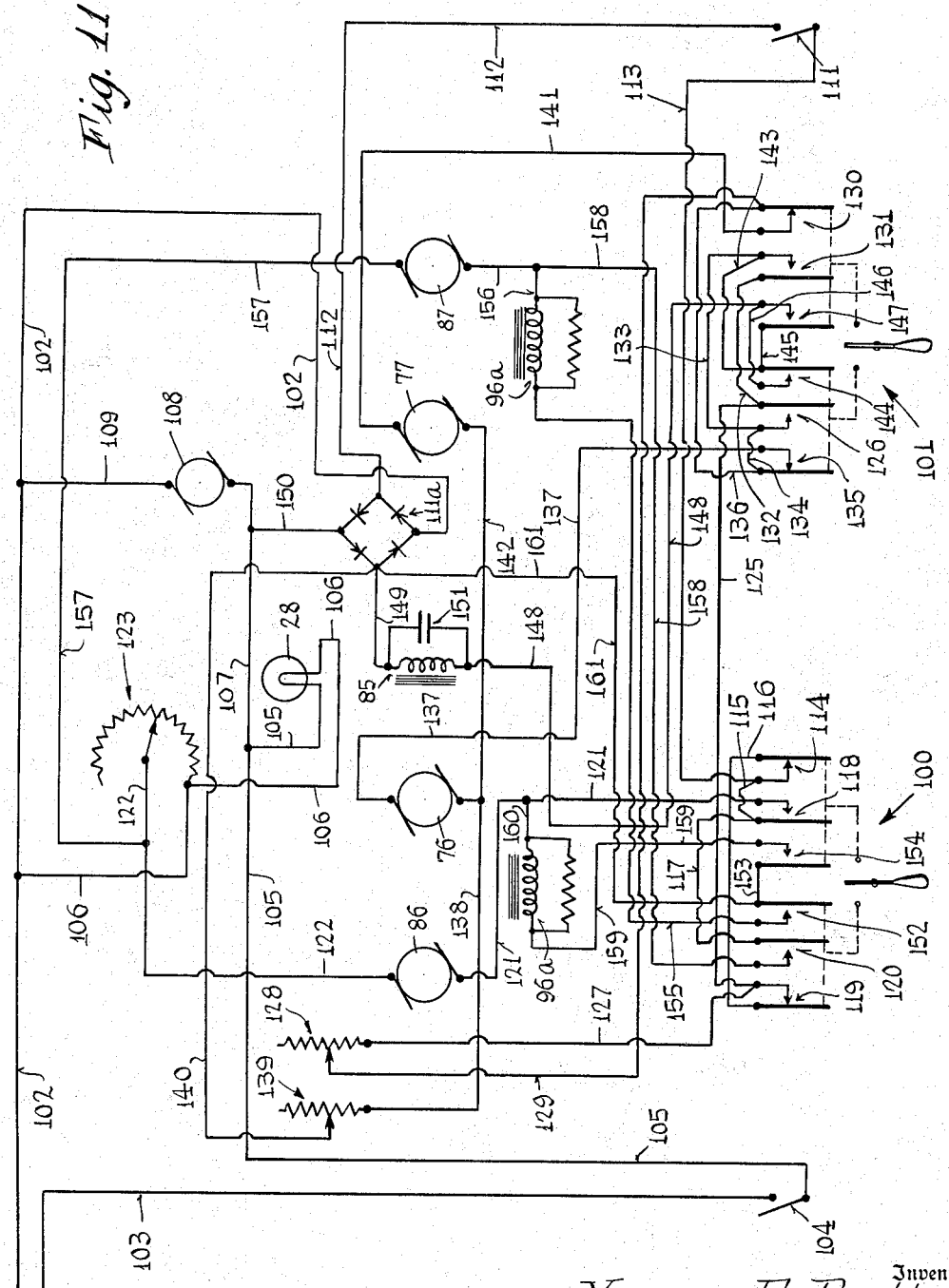

United States Patent Office 2,746,344
Patented May 22, 1956

2,746,344

MICROFILM READER

Verneur E. Pratt and George F. Gray, Norwalk, Conn., assignors to Diebold, Incorporated, Canton, Ohio, a corporation of Ohio Application September 21, 1951, Serial No. 247,682

8 Claims. (Cl. 88—24)

This invention relates to microfilm readers or viewers.

An object of the invention is to provide an improved microfilm reader or viewer wherein the size of the displayed image may be either enlarged or reduced and the focus automatically maintained by manipulation of a single, manually operable member while, for any setting of said member, the focus of the image may be readily varied at the will of the operator, as for the purpose of accommodating the different emulsion locations of positive or negative film.

Another object of the invention is to provide an improved microfilm reader or viewer which is so arranged and organized that an image projected on the screen may, without involving movement of the screen, be enlarged or reduced while automatically maintaining a sharp focus.

A further object of the invention is to provide an improved device as above set forth, wherein the image may be rotated any desired amount in either direction, and wherein different fractional portions of the image which is on the film, may be enlarged to cover the entire screen.

Still another object of the invention is to provide simplified and improved film-shifting means in a microfilm reader, enabling the operator conveniently to feed the film either quickly or slowly in either of opposite directions, or to shift the film laterally, said means having separate low speed and high speed switches operable by single actuators which are movable between forward, reverse, and at-rest positions, and having novel braking or damping means for quickly halting the film, said means additionally functioning to maintain the film taut at the projection point when the film is at rest.

A still further object of the invention is to provide an improved throat or film guide means at the projection point, which automatically provides added clearance for the film when it is being fed rapidly, thereby to minimize attrition of the film.

Still another object of the invention is to provide, in a microfilm reader of the type having a housing, a screen and opening for the latter at the front of the housing, a novel, improved dual-mirror assemblage for the projection system which while normally larger than the screen opening, may be folded or collapsed to a smaller size such that it can pass through said opening during assembly or servicing of the reader.

Yet another object of the invention is to provide an improved microfilm reader according to the foregoing, which is economical to fabricate, compact, simple in construction and operation, and reliable in use.

Other features and advantages will hereinafter appear.

In the accompanying drawings:

Figure 1 is a front elevational view of a microfilm reader embodying the invention.

Fig. 2 is a vertical sectional view of the reader taken on line 2—2 of Fig. 1.

Fig. 4 is a vertical sectional view taken on line 4—4 of Fig. 2.

Fig. 5 is a fragmentary sectional view taken on line 5—5 of Fig. 2.

Fig. 6 is a fragmentary sectional view taken on line 6—6 of Fig. 2.

Fig. 7 is a fragmentary view showing a portion of the cam and screw adjustment of the focusing means.

Fig. 8 is a view partly in elevation and partly in vertical section, of the adjustment mechanism of Fig. 7.

Fig. 9 is a view partly in elevation and partly in vertical section, showing the film guide means or throat of the reader, with an electromagnetic actuator.

Fig. 10 is an enlarged view partly in vertical section and partly in elevation, showing a magnetic clutch associated with the film feeding mechanism of the reader.

Fig. 11 is a schematic circuit diagram of the microfilm reader.

Figure 3:
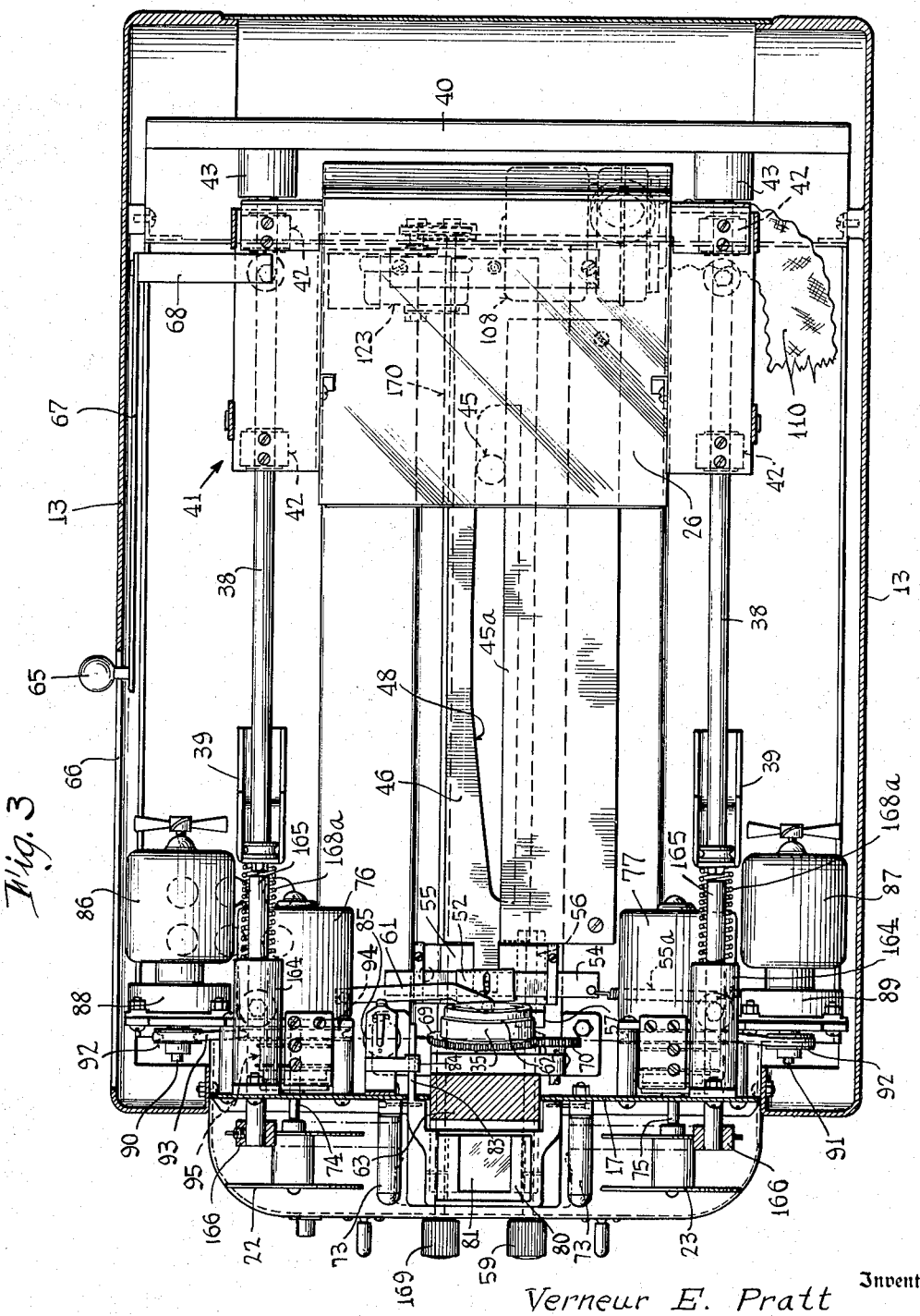
Fig. 3 is a horizontal sectional view taken on line 3—3 of Fig. 2.

Referring to Figs. 1, 2 and 3 the microfilm reader or viewer shown therein comprises a housing 10 having top, bottom and side walls 11, 12 and 13 respectively, and a humped back wall 14. At its front upper portion the housing 10 has a large rectangular opening 15, in which a stationary screen 16 is mounted. At the front lower portion of the housing a recessed wall 17 is provided, together with forwardly extended upper and lower wall portions 18 and 19 respectively. From the center of the wall portion 18 there extends downwardly a panel 20, below which a film guide mechanism or throat 21 is mounted. The location of the throat 21 is hereinafter referred to as the projection point of the reader, inasmuch as it is the place where the film is subjected to light rays, causing the image on the film to be enlarged and displayed on the screen 16, as will be later fully brought out.

On the front of the recessed wall 17, at each side of the panel 20 spools 22 and 23 are mounted, adapted to carry strip film 24 passing through the throat 21.

The term "strip film" as used herein and in the appended claims is intended to cover both roll film and film having the form of relatively short straight strips, inasmuch as the present apparatus has utility with both types.

In accordance with the present invention a novel image-projection means is provided, enabling an image on the film 24 to be enlarged and displayed on the screen 16 and to have its size either increased or decreased while the focus is maintained, simply by manipulation of a single manually operable member, said means being so constituted that the focus of the image may be adjusted at the will of the operator for any setting of said member, thereby to enable both positive and negative films, with their different emulsion locations, to be sharply focused. In accomplishing this, referring to Fig. 2, mirrors 25 and 26 are provided, said mirrors being angularly disposed with respect to each other and being arranged to reflect onto the back of the screen 16 a light beam or image directed against the mirror 26 from the front lower portion of the housing 10. Such a light beam is indicated by the broken line and arrows 27.

The source of light for the beam 27 comprises a bulb 28 mounted in front of a reflector 29 and arranged to direct light through a condensing lens 30 against a mirror 31, the latter reflecting the light downward through a second condensing lens 32 and through the film 24 at the throat 21. Below the throat 21 a mirror 33 is disposed for directing the light image from the film 24 backward against the mirror 26 located at the rear of the housing.

Interposed between the mirrors 26 and 33, and adjacent the latter is a focusing lens 34, mounted in a tubular holder 35 which carries an image-rotating device comprising a prism 36 and a mirror 37. The functioning of the image-rotating device will be explained more fully hereinafter. The course taken by the light from the bulb 28 through the lenses and mirrors 30, 31, 32, 33, 34, and the prism 36 is clearly indicated by the broken line 27.

For the purpose of enlarging or reducing the image on the screen 16 without moving the latter, and without impairing the sharpness or focus of the image, adjustment means are provided for horizontally shifting the mirrors 25 and 26 as a unit and simultaneously shifting the focusing lens 34 in predetermined relation to the mirrors. In carrying this out, the housing 10 is provided with a pair of slide bars 38 carried by brackets 39 and 40. On the bars 38 a carriage 41 is slidably mounted, said carriage carrying the mirrors 25 and 26 and having bearing collars 42 movable along the bars whereby the mirrors 25 and 26 may be shifted from a maximum enlarging position as shown by the solid lines in Fig. 2, to a minimum enlarging position indicated by the dotted lines in this figure. To limit the movement of the mirrors 25 and 26, bumpers 43 and 44 are provided on the bars 38, for engagement with the collars 42.

On its lower portion the mirror 26 carries a roller 45 movable along a straight edge backing member 45a and engageable with a cam lever 46 pivoted on the housing at 47. Referring to Fig. 3, the lever 46 has a sloping cam surface 48 so arranged that when the mirrors 25 and 26 are brought forward toward the screen 16 the lever 46 will be shifted slightly in a clockwise direction as viewed in Fig. 3. Opposite movement of the lever 46 in response to rearward movement of the mirrors is effected by a spring to be described shortly. With the parts arranged as indicated in the drawing, the camming edge 48 will be non-linear, that is, instead of following a straight line it will be compounded of arcs having different radii.

At its front end the lever 46 has an extension 49 carrying a pin 50 slidable in a slot 51 of a cam plate 52 having a camming surface or edge 53. The cam plate 52 is carried by a slide bar 54 longitudinally movable in a block 55 having an adjusting screw 56 threaded into it. The block 55 at one end is carried by a bearing block 57 secured to the bottom 12 of the housing 10. At its other end the block 55 has a bearing foot 58 riding on the housing bottom 12. A spring 55a connected to the block 55 continually pulls it to the right, Figs. 7 and 8, and also holds the lever 46 at all times in engagement with the roller 45. The adjusting screw 56 has one end anchored against axial shifting in the bearing block 57, and has a smooth shank passing forwardly through the wall portion 19 of the housing, mounting a knob 59 by which it may be turned to shift the block 55 either forward or backward.

Engaging the camming edge 53 of the plate 52 is a pin 60 carried by an arm 61 pivotally mounted on the housing, said pin being engageable with a shoulder 62, Figs. 2 and 6, on the tubular holder 35. The said holder is axially movable in a block 63, and is spring-urged rearwardly in the bore of said block by a leaf spring 64. Thus the spring 64 maintains the shoulder 62 of the holder 35 continually in engagement with the pin 60, and maintains said pin in engagement with the camming edge 53 of the cam plate 52.

With the above organization it will be seen that movement of the mirror assemblage 25, 26 in either direction will shift the cam lever 46 sidewise, resulting in longitudinal movement of the slide bar 54 and causing the camming edge 53 of the cam plate 52 on the bar to shift the pin 60 and thereby axially move the tubular holder 35 for the lens 34. The camming parts are so related to each other that the movement of the holder 35 and the focusing lens 34 is just sufficient to maintain a sharp focus of the image on the screen 16 when the mirror assemblage 25, 26 is moved.

Referring to Fig. 3, movement of the mirror assemblage is made convenient for an operator by the provision of a knob 65 which projects through a slot 66 in the left hand wall 13 of the housing 10, said knob being carried on an arm 67 secured by means of a bracket 68 to the carriage 41. Forward movement of the knob 65 will thus shift the mirrors 25 and 26 forward, and will shift the focusing lens 34 backward or toward the mirror. Such movement will reduce the size of the image on the screen 16 and at the same time will maintain the image in sharp focus. Moreover, for any setting of the knob 65 and mirrors 25 and 26, the focus of the image may be readjusted by the simple process of turning the knob 59 and screw 56, inasmuch as this results in a shifting of the slide bar 54 laterally, directly moving the pin 61 and the tubular holder 35 with its focusing lens 34. Thus positive and negative film, representing emulsion locations which are about .005 inch apart, may be readily brought into sharp focus easily and quickly when a change is made from one to the other. All of the above adjustments may be accomplished without shifting the screen 16.

In accordance with the present invention, in conjunction with the image enlarging, reducing and focusing organization described above there is provided means for rotating the image projected on the screen 16 without altering the focus or size of the image. This means includes the prism 36 and mirror 37, and comprises a device for rotating the tubular body 35 at will without shifting it longitudinally in either direction. As shown in Figs. 2, 3 and 6, the holder 35 is provided with a spur gear 69 engaged by a pinion 70 carried on a shaft 71 mounting a knob 72 at the front of the panel 20. Turning of the knob 72 will result in rotation of the holder 35, causing the image to be turned or rotatably adjusted, and the rotation may be through any desired angle. For example, the image may be turned upside down, or clockwise or counterclockwise any amount.

In accordance with the present invention, novel and improved means are provided for feeding the film 24 in either direction through the throat 21, either quickly or slowly as desired, and also for shifting the film laterally to project a fractional part of the film on the screen over its entirety.

Referring to Fig. 1, the film 24 extends between horizontally extending guide post 73 mounted in pairs on each side of the throat 21. The spools 22 and 23 carrying the film 24 are mounted on shafts 74 and 75 of fast-feed electric motors 76 and 77 respectively. Energization of one motor or the other will result in the spools being rotated to feed the film 24 in one direction or the other at relatively high speeds. The motors 76 and 77 are utilized when it is desired to rewind the film, or to skip from one given portion to another portion located at a remote point from the first portion.

By the present invention, in order to prevent attrition of the film 24 when it is being rapidly fed through the throat 21 the latter is constructed to automatically provide increased clearance for the film during such feeding, together with a delayed action in returning to normal clearance position upon the film ceasing to feed. Referring to Fig. 9, the throat 21 comprises a lower stationary supporting member 78 having a transparent film supporting plate 79, and an upper pivotally movable cooperable member 80 having a transparent plate 81. The member 80 is pivoted at 82 and has a rearward extension 83 engageable by an arm 84 carried by an armature 84a of an electromagnet 85. When the magnet 85 is de-energized as shown in Fig. 9, the throat 21 will be closed as indicated and the plates 79 and 81 will press on opposite sides of the film 24 so as to accurately position the latter at the projection point. If, however, the magnet 85 should be energized it will swing the armature 84a and arm 84 thereof downward, causing clockwise turning of the extension 83 and the throat part 80 to raise said part and provide increased clearance for the film. Automatic energization of the magnet 85 whenever either of the motors 76 or 77 is energized is provided for, as will be explained later in detail.

It is pointed out here, however, that the inertia of the magnet armature 81 and the movable parts of the throat 21 is considerably less than the inertia of the motors 76, 77 and accordingly whenever said motors and magnet are simultaneously energized the throat 21 will be opened prior to any appreciable movement of the film 24. Thus there is minimized the likelihood of wear on the film.

For the purpose of feeding the film slowly whereby the moving image may be scanned on the screen 16, slow feed electric motors 86 and 87 are provided having gear reductions 88 and 89 provided with slow speed shafts 90 and 91. The shafts 90 and 91 have pulleys 92 driving belts 93 passing over pulleys 94, Figs. 3 and 10 coupled to magnetic clutches 95. Each of the clutches 95 includes a magnetic cup 96 and an electric coil 96a energized through suitable slip rings and brushes 97 as shown in Fig. 10. Cooperable with the coils 96a are armatures 98 which are coupled to the shafts 74 and 75 by means of pins 99 and arms 99a rigid on the shafts. Wire springs 99b carried by the arms 99a normally hold the armature 98 away from the coils 96a and cups 96. When either of the coils 96a is energized it will connect the slow speed motor associated with it to the spool shaft so as to drive the same through the pulleys, belts and gear reductions. For such slow driving of the shafts and spools the high speed motors 76 and 77 are de-energized as will be later brought out.

A novel control to effect selective operation of the motors 76, 77, 86 and 87 is provided by the invention, being accomplished by means of lever switches 100 and 101, Fig. 1, the switch 100 controlling the motors 86 and 87, and the switch 101 controlling the motors 76 and 77. In conjunction with such control, for feeding the film 24 either slowly or quickly past the projection point, there is further provided by this invention damping or braking means for preventing overshooting of the film, and also means for maintaining the film taut between the pulleys 22 and 23.

Referring to Fig. 11, showing the circuit diagram of the microfilm reader, power is supplied through main lead wires 102 and 103, the latter being connected to a power switch 104. From the switch 104 a wire 105 leads to the lamp 28 which in turn is connected by a wire 106 to the lead 102. The wire 105 is connected by a wire 107 to a blower 108 which is in turn connected by a wire 109 to the main lead 102.

As is well understood, the blower 108 is arranged to provide cooling for the lamp 28 through a hose 110 and suitable ducts and vents. When the power switch 104 is closed, the lamp 28 and blower 108 will be simultaneously energized. Energization of the remainder of the circuit is effected through a switch 111 which is connected to a rectifier bridge 111a by a wire 112. The bridge 111a has one terminal connected to the wire 102. From the switch 111 a wire 113 leads to a pair of normally closed contacts 114 of the switch 100. The contacts 114 are connected by jumpers 115, 116, 117 with pairs of open and closed contacts 118, 119 and 120. One contact of the pair 118 is connected by a wire 121 to the motor 86, and said motor is connected by a wire 122 to a rheostat 123 in turn connected by a wire 124 to the main lead 102.

One of the pair of contacts 119 is connected by a wire 125 to a pair of normally open contacts 126 of the switch 101, and by a wire 127 to an adjustable resistor 128 connected by a wire 129 to a pair of normally closed contacts 130 of the switch 101. The contacts of the open pair 126 are connected respectively to contacts of an open pair 131 by means of jumpers 132 and 133. The jumper 133 is also connected by a jumper 134 to a pair of normally closed contacts 135, and the jumper 134 is connected by a jumper 136 to the closed pair of contacts 130. A contact of the closed pair 135 is connected by a wire 137 with the motor 76 which is in turn connected by a wire 138 to an adjustable resistor 139 connected by a wire 140 to the bridge rectifier 111a. A contact of the pair 130 is connected by a wire 141 to the fast-feed motor 77 which is in turn connected by a wire 142 to the wire 138. A contact from the normally open pair 131 is connected by a jumper 143 to a normally open pair of contacts 144 connected respectively by jumpers 145 and 146 to contacts of a normally open pair 147. A contact of the open pair 147 is connected by a wire 148 to the electromagnet 85, said magnet being in turn connected by a wire 149 with the rectifier bridge 111a, which latter is energized through the wire 102 and a wire 150 connected to the wire 107. In accordance with this invention the electromagnet 85 is shunted by a condenser 151 which acts to momentarily sustain the magnet energization where the circuit thereof is opened, thereby delaying closing of the throat 21 until the film has completely stopped its travel, as will be later explained.

The switch 100 has a normally open pair of contacts 152 connected by a jumper 153 with a normally open pair of contacts 154. A contact of the pair 152 is connected by a wire 155 with one of the clutch coils 96a, said coil being in turn connected by a wire 156 with the motor 87. From the motor 87 a wire 157 leads to the wire 122. From the wire 156 a wire 158 connects with a contact of the normally open pair 120 of the switch 100. A contact of the normally open pair 154 is connected by a wire 159 with a clutch coil 96a which is in turn connected by a wire 160 with the wire 121.

It will be understood that the clutch coil 96a which is connected with the wire 160 is associated with the motor 86, and that the clutch coil 96a which is connected to the wire 156 is associated with the motor 87.

The normally open contacts 152, 154 are connected by a wire 161 with the wire 149 leading from the rectifier bridge. The speed of the motors 86, 87 may be regulated by the rheostat 123 to control the speed of feed of the film 24.

The operation of the lever switch 100 is such that when the lever is shifted to the left or clockwise as viewed in Fig. 11, the normally open pairs of contacts 154 and 118 will become closed and the normally closed contacts 114 will open. The normally closed pair of contacts 119 will remain closed. When the lever is shifted to the right or counterclockwise, the normally closed pair of contacts 119 will be open, and the pairs of normally open contacts 120, 152 and 118 will be closed. The normally closed pair of contacts 114 will remain closed.

The pair of normally open and normally closed contacts of the switch 101 will respond in a like manner to actuation of the lever of said switch either to the right or to the left, as just described for the switch 100.

Operation of the microfilm reader as set forth in the circuit diagram of Fig. 11 is as follows: The operator first closes the power switch 104. This energizes the lamp 28 and the blower 108, thus setting up the light source of the projection system. It also energizes the bridge rectifier 111a. The switch 111 is now closed. This energizes the fast feed motors 76 and 77 through the adjustable resistors 128 and 139, from the rectifier 111a. The said resistors are so adjusted that each of the motors 76, 77 will have approximately 60 volts applied to them instead of the rated 110 volts. Therefore they will be under-energized and react in opposition to each other, tending to rotate the spools 22 and 23 in directions indicated by the arrows of Fig. 1 which would result in winding up the film on each spool if rotation were established. No turning results, however, because of the balance of the motors and the inherent friction of the system including the friction of the film on the film guide. The film 24 is therefore kept taut and under tension between the spools 22 and 23 as a consequence of the continual pull exerted on the film by the spools and the under-energized motors 76, 77. The clutch coils 96a will be de-energized, as will also be the electromagnet 85 of the throat 21. For this condition, an image will be projected on the screen 16, having a size as determined by the position of the mirrors 25 and 26. If the mirrors are in the full line position shown in Fig. 2, the image will be enlarged the maximum extent, and the screen 16 will show only a fractional portion of the total image on the film which is delineated or outlined at the projection point, due to the great enlargement effected. If the mirrors 25, 26 are in the dotted line position shown in Fig. 2, the enlargement effected is a minimum and substantially the entire image which is outlined at the projection point 21 will be shown on the screen 16.

If it should be desired to feed the film 24 either to the left or to the right so as to scan the images on the screen 16, the lever of the switch 100 is thrown either to the left or to the right. This will energize one or the other of the clutch coils 96a and the slow feed motors 86, 87. It will be noted that the energization of the clutches is effected through the rectifier 111a whereby the clutches have substantially D. C. energization. At the same time the under-energization of the fast feed motors 76, 77 will be discontinued by virtue of opening of one or the other of the normally closed pair of contacts 114, 119. The film 24 will thus be slowly fed either to the right or to the left by virtue of the gear and belt reduction in the drive of the motors 86, 87. When the desired point on the film has been reached the switch 100 is returned to neutral position whereupon the fast feed motors 76, 77 will be then partially energized, maintaining the film taut and effecting a damping to prevent creeping or overshooting of the film. The switch 100 is preferably of the latching type whereupon it will remain either in neutral position, or left or right energizing position.

If it should be desired to rapidly feed the film from one spool to the other, as for the purpose of rewinding or retracting to a previous position, etc., this will be effected by actuation of the switch 101 which is preferably not of the latching type but instead of the momentary contact type. Moving the lever of the switch 101 either to the right or to the left will energize fully one or the other of the fast feed motors 76, 77 and de-energize the other of said motors. It will also energize the electromagnet 85 to open the throat 21, through one of the pairs of contacts 144, 147. Inasmuch as the clutch coils 96a are not energized, the slow feed motors 86, 87 will not provide any drag on the rotation of the spools 22, 23. Because of the direct drive connection of the motors 76, 77 the film 24 will be rapidly fed in one direction or the other through the throat 21, and since the throat has been opened by energization of the electromagnet 85, attrition or undue wear of the film will be prevented. As soon as the switch 101 is released it will immediately return to its neutral position, reducing the full energization of the energized one of the fast feed motors 76, 77 to an under-energization. At the same time the de-energization of the other of the fast feed motors 76, 77 will be restored to an under-energization, thereby providing a damping, and effecting a rapid halting of the film 24. The provision of the condenser 151 and its delay action on closing of the throat 21, in combination with the braking of the film, results in the throat closing only after the film has stopped moving completely, thus insuring that the film will not be scratched or marked by the throat.

It will be noted that the D. C. supply from the rectifier bridge 111a of the apparatus must pass through, and is therefore controlled by, the switch 100, since it passes through the wire 112 and switch 111, and then through the wire 113 connected to the pair of contacts 114 of the switch 100. This pair of contacts, which is normally closed, is connected in series with the normally closed pair of contacts 119 of the switch 100 through the wire 116. To the contacts 119 the wire 127 is connected, said wire constituting a feed for the fast feed motors 76, 77. By this organization the slow feed mechanism for the film dominates the fast feed mechanism, in the following manner: If, to feed the film slowly, the switch 100 should be actuated in a direction to open the pair of contacts 114, the under-energization for the fast feed motors through the wire 127 will be discontinued, since no energy will be received by the pair of contacts 119. Moreover no energization of either of the fast feed motors 76, 77 may be effected if, now, the switch 101 should be actuated. Likewise, if the normally closed contacts 119 are opened by opposite actuation of the switch 100, the same de-energization of the fast feed motors will be effected, through disconnection of the wire 127 from the initial feed circuit 112, 113. This also means that if the fast feed switch 101 is being operated and then the slow feed switch 100 should be at the same time actuated, the slow feed mechanism will dominate by virtue of its receiving normal energization and the fast feed motors 76, 77 being completely de-energized.

In accordance with the invention, means are provided for shifting the film 24 laterally at the projection point whereby when a maximum enlargement is utilized in the reader, fractional marginal portions of the film at either side may be displayed on the screen 16 to cover the latter in its entirety. In accomplishing this, referring to Figs. 2 and 3, there is provided a carriage including the front wall portion 17 of the housing. Said wall portion is carried by a pair of bearing sleeves 164 slidable on slide bars 165 rigidly mounted on a frame member 166 which is carried by the housing 10. This movable assembly comprising the wall portion 17 carries the fast and slow feed motors 76, 77, 86 and 87, carries the throat 21 and the electromagnet 85 controlling the throat, and carries the spools 22, 23. It does not, however, include the panel 20 or wall portion 18, nor does it include the tubular holder 35 and focusing lens 34, or mirrors 33 and 31 and condensing lens 32. Referring to Fig. 6, the wall portion 17 may be shifted forward or backward by manipulation of a knob 167 carried by a rod 168 which is secured to the wall portion 17. Shifting of the said front carriage of the machine thus effects a lateral shifting of the film 24 and throat 21 with respect to the projection system, and enables fractional portions of the image on the film including either margin of the film to be projected on the screen 16 and cover the latter in its entirety.

The front carriage is normally urged to a forward position by springs 168a, Figs. 2 and 3, and may be locked in any adjusted position by a cam 168b, Fig. 6, actuated by turning the knob 167, the cam bearing against the frame block 63.

Referring now to Figs. 2 and 11, actuation of the rheostat 123 is accomplished at the front of the housing 10 by a knob 169 connected to a shaft 170 driving the rheostat 123 through belts and pulleys 171.

By the present invention the mirror assemblage comprising the mirrors 25, 26 may be readily removed from the housing 10 through the opening in which the screen 16 is mounted even though said assemblage is normally larger in overall dimension than said opening. To accomplish this, the upper mirror 25 is connected by pivot brackets 172 to the carriage 41, and also connected to the carriage by slotted braces 173, angle brackets 174 and spring urged pins 175, Figs. 2 and 5. The slots in the braces 173 have enlarged ends receiving reduced head portions 176 of the pins 175 whereby the mirror 25 is locked in its operative position. However, if the pins 175 are shifted axially to move the head portions 176 out of the slot ends of the braces 173, the mirror 25 may be swung downward to the dotted line position shown in Fig. 2. After this has been done the slide bar 38 may be disassembled from the brackets 39 and 40 whereupon the entire assemblage of mirrors 25, 26, carriage 41 and slide bars 38 may be removed forwardly from the casing through the opening provided for the screen 16.

It will be seen that there has been thus provided by the present invention an improved microfilm reader wherein the size of the display image may be either enlarged or reduced and the focus maintained by manipulation of a single manually operable member comprising the knob 65, and wherein for any setting of said member the focus of the image may be readily varied at the will of the operator by adjustment of the knob 72.

There has also been provided an improved reader wherein an image projected on a screen may, without involving movement of the screen, be enlarged or reduced while maintaining a sharp focus. In conjunction with the above there has been provided improved and simplified means for rotating the image any desired amount, and means enabling various fractional portions of the image on the film, including marginal portions at either side of the film, to be enlarged to cover the entire screen.

The invention has also provided simple and effective means for shifting the film either laterally or longitudinally, in the latter case at high speeds for rewinding purposes or at low adjustable speeds for reading or scanning purposes, and has provided means damping the movement of the film to prevent its over-shooting when being fed, particularly at high speed. Such damping means is also operative to maintain the film taut at all times where it passes through the throat or projection point of the machine.

Variations and modifications may be made within the scope of the claims and portions of the improvements may be used without others.

We claim:

1. A microfilm reader comprising a housing having an opening at its front; a screen removably mounted in said opening; a projection system in said housing, for projecting an image from a film onto the screen, said system including a mirror assembly comprising a pair of angularly disposed mirrors having a large included angle, said assembly being removably mounted in the housing and being larger in overall size than the screen opening; and means connecting the mirrors to each other, enabling one mirror to be swung toward the other to reduce the size of the assembly sufficiently so that it can be readily removed from the housing through the screen opening.

2. A microfilm reader having a screen; adjustable image-altering means including a carriage having a mirror unit including a pair of angularly disposed mirrors mounted thereon for movement toward and away from the screen and arranged to reflect the image on the screen from different adjusted positions; means including a focusing lens mounted for movement toward and away from the mirror unit for directing an enlarged image against said mirror unit; and adjusting means for simultaneously shifting the mirror unit and lens different extents in image-enlarging or -reducing directions to change the degree of enlargement and maintain the focus of the image appearing on the screen, said adjusting means including a single manually operable lever connected to the carriage to adjust the position of the mirror unit carried thereby, a first cam mechanism operatively connected with said mirror unit and actuated thereby, a second cam mechanism engagingly connected to the first cam mechanism for relative movement transversely of said first cam mechanism and operatively associated with said focusing lens, said second camming mechanism being actuated by said first cam mechanism when the carrier is moved upon manipulation of said lever so that the camming surface of one of said cam mechanisms actuates the relative movement of the other said cam mechanism whereby the relative movement of the lens and screens are proportionately maintained so that the focus of the particular image projected on the screen is maintained.

3. A microfilm reader having a housing; a screen mounted on the front of the housing; adjustable image-altering means including a carriage having a mirror unit mounted thereon for movement toward and away from the screen and arranged to reflect the image on the screen from different adjusted positions; means including a focusing lens mounted for movement toward and away from the mirror unit for directing an enlarged image against the mirror; and adjusting means for simultaneously shifting the mirror and lens different extents in image-enlarging or -reducing directions to change the degree of enlargement to maintain the focus of the image appearing on the screen, said adjusting means including a single manually operable lever connected to the carriage and projecting from the side of the housing and movable with respect thereto, to adjust the position of said carriage and mirror unit carried thereby, a first cam mechanism operatively connected with said mirror unit and actuated thereby, a second cam mechanism connected to the first cam mechanism for relative movement transversely of said first cam mechanism and operatively associated with said focusing lens, said second camming mechanism being actuated by said first cam mechanism when the carrier is moved upon manipulation of said lever so that the camming surface of one of said cam mechanisms actuates the relative movement of the other said cam mechanism whereby the relative movement of the lens and screens are proportionately maintained so that the focus of the particular image projected on the screen is maintained.

4. A microfilm reader including a casing having a screen, a reflecting mirror unit mounted for longitudinal movement within said casing to move toward and away from said screen, a lens holding means mounted on said casing for movement toward and away from said mirrors for directing an enlarged image against said unit to be reflected thereby against said screen, operating means operatively connecting said mirror unit with said lens holding means for simultaneously shifting said mirror unit and lens holding means relative varying amounts in image enlarging or reducing directions so as to change the degree of enlargement and maintain the focus of the image appearing on the screen, said operating means including an elongate cam lever having a curvilinear camming edge extending along the path traveled by said mirror unit, said cam lever being pivoted to said casing for movement transversely thereof, a cam follower connected to said mirror unit engaging said camming edge for pivoting said cam lever as said mirrors are longitudinally moved, a cam means connected to said lever and engaging said lens holding means, said cam means being transversely displaced as the cam lever is pivoted by the longitudinal displacement of said mirror unit whereby said transverse displacement of said cam means effects axial movement of said lens holding means relative to said mirror unit to maintain the focus of the reflected image.

5. The invention as defined in claim 4 including lens focusing means operatively connected to said cam means for manually shifting said cam means longitudinally at will with respect to the mirror unit whereby said lens holding means is axially moved accordingly to the longitudinal displacement of said cam means relative to said mirror unit to sharpen the focus of the image independently of its enlargement.

6. The invention as defined in claim 5 wherein said lens focusing means includes a screw connected to said cam means whereby rotation of said screw effects independent longitudinal adjustment of said cam means to effect independent axial displacement of said lens holding means relative to said mirror unit, said screw being readily adaptable for rotation by an operator during the operation of said reader.

7. The invention as defined in claim 5 including means rigid with the lens holding means for rotating the image on the screen to a desired reading position, and a manual operator extending forwardly of said casing for rotating said lens holding means for rotatably adjusting a projected image in the desired position on the screen.

8. A microfilm reader having a screen; adjustable image-altering means including a mirror mounted for movement in a path extending toward and away from the screen, and arranged to reflect an image on the screen from different adjusted positions; means including a focusing lens mounted for movement toward and away from the mirror, for directing an enlarged image against the mirror; adjustment means including a single manually operable device for simultaneously shifting the mirror and lens different extents in image-enlarging or reducing directions to change the degree of enlargement and automatically maintain the focus of the image appearing on the screen, said adjustment means also including an elongate cam plate carried by a pivot located at one side of the mirror and having a curvilinear camming edge extending along the path of movement of the mirror, said cam plate comprising an operating means connected between the mirror and the lens; and means connected to said cam plate operatively connected to said lens whereby said lens can be independently adjusted relative to said mirror by an operator at will.

References Cited in the file of this patent

UNITED STATES PATENTS

| | | |
|---|---|---|
| 2,100,967 | Levy | Nov. 30, 1937 |
| 2,137,028 | Rau | Nov. 15, 1938 |
| 2,377,476 | Berglund | June 5, 1945 |
| 2,437,893 | Swanson | Mar. 16, 1948 |
| 2,481,850 | Lindner | Sept. 13, 1949 |
| 2,487,476 | Pratt | Nov. 8, 1951 |
| 2,558,982 | Pratt | July 3, 1951 |
| 2,564,440 | Maser | Aug. 14, 1951 |
| 2,569,918 | Berggren | Oct. 2, 1951 |